United States Patent
Hoffstadt

(10) Patent No.: US 12,363,243 B2
(45) Date of Patent: Jul. 15, 2025

(54) METHOD FOR PERFORMING TRANSFORMATIONS OF COLOR DATA FROM A SOURCE COLOR SPACE TO A TARGET COLOR SPACE USING A TRANSFORMATION RULE TRV

(71) Applicant: GMG GmbH & Co. KG, Tübingen (DE)

(72) Inventor: Johannes Hoffstadt, Ulm (DE)

(73) Assignee: GMG GmbH & Co. KG, Tübingen (DE)

(*) Notice: Subject to any disclaimer, the term of this patent is extended or adjusted under 35 U.S.C. 154(b) by 0 days.

(21) Appl. No.: 18/234,087

(22) Filed: Aug. 15, 2023

(65) Prior Publication Data

US 2024/0056543 A1    Feb. 15, 2024

(30) Foreign Application Priority Data

Aug. 15, 2022  (EP) ................................. 22020392

(51) Int. Cl.
*H04N 1/60* (2006.01)
*H04N 1/54* (2006.01)
*H04N 1/00* (2006.01)

(52) U.S. Cl.
CPC ............. *H04N 1/54* (2013.01); *H04N 1/6025* (2013.01); *H04N 1/6033* (2013.01)

(58) Field of Classification Search
CPC ...... H04N 1/54; H04N 1/6025; H04N 1/6033; H04N 1/6036; H04N 1/6016; H04N 1/6019

USPC ................. 358/1.9, 2.1, 1.1, 1.11–1.18, 523; 382/276, 277, 302

See application file for complete search history.

(56) References Cited

U.S. PATENT DOCUMENTS

| 8,098,260 | B1* | 1/2012 | Shaick | H04N 1/6019 345/589 |
|---|---|---|---|---|
| 2012/0120424 | A1* | 5/2012 | Hirano | H04N 1/62 358/1.9 |
| 2019/0297226 | A1* | 9/2019 | Ohkubo | H04N 1/60 |
| 2021/0329144 | A1* | 10/2021 | Matsushima | G01J 3/52 |
| 2022/0377207 | A1* | 11/2022 | Tröster | H04N 1/6027 |
| 2024/0056542 | A1* | 2/2024 | Hoffstadt | H04N 1/54 |

* cited by examiner

*Primary Examiner* — Chad Dickerson
(74) *Attorney, Agent, or Firm* — Millen, White, Zelano & Branigan, P.C.; Ryan Pool

(57) ABSTRACT

The invention includes a method for performing transformations of color data, where the results of a transformation rule TRV can be corrected to a verified nominal value data set of the m values of the target color space Z1, which is determined for a set of color data Q1, from the n colors of the source color space. A copy of Q1 is created as data set Q2. The set of color data Q2 is transformed using the provided transformation rule TRV and creates another data set of the m values of the target color space Z2. The data set Q2 is optimized and transformed back to Z2 until the differences between Z1 and Z2 are minimized. The difference between the original data set Q1 and the optimized data set Q2 and the optimized result Z2 and the target data set Z1 can be applied to the transformations of color data.

5 Claims, 2 Drawing Sheets

METHOD FOR PERFORMING TRANSFORMATIONS OF COLOR DATA FROM A SOURCE COLOR SPACE TO A TARGET COLOR SPACE USING A TRANSFORMATION RULE TRV

The present invention relates to a method for performing transformations of color data from a source color space with n colors to a target color space with m values using a transformation rule TRV.

In the printing industry, color transformations are very often required to produce the data sets for the color printed products to be printed.

The starting point is digital layouts, which may contain, for example, color images from photography or scanning, illustrations and text. These layouts are templates that are to be reproduced accordingly in the form of printed products. Such a layout has been designed or developed in whatever form and represents in terms of color appearance what is desired for the intended purpose. A layout usually comprises several layout objects. Each individual layout object therefore has a color appearance that can be uniquely identified. As is well known, color appearances are created by mixing only a few colors, for printed products, for example, by simply printing screened printing inks on top of each other, with each color making a certain contribution through its effect and the final result being created in the interaction of the different color layers.

The color appearance of each layout object is defined by its color values (of image pixels, outline colors, or fill colors), which represent the data source. In the case of image pixels, there are often millions of pixels, each with its own color values. These source color values always refer to a source color space with a specific number of colors. This means that each object in the layout is assigned a color space, which usually has a relationship to a device, often a very specific RGB color space such as sRGB or Adobe RGB, or a CMYK color space, only black (grayscale) or another printing color space. The object color values are quantified accordingly as RGB values, CMYK or grayscale values (0-100% color), or other color values. The total number of device colors of the source color space is denoted here by n.

Color spaces are usually described by ICC color profiles (ISO 15076-1:2010), layouts by PDF and PDF/X files (ISO 15930 series) that contain or can reference these ICC color profiles. For the most different reasons and motives the layout is to be reproduced. A wide variety of printing processes and presses are available for reproduction. These have the possibility to apply a certain number of colors in a certain way on a carrier material. These are the device colors of the printing system. These define or are the basis of the target color space, which in turn comprises all conceivable combinations of the device colors of the printing system. This is referred to as the m device colors of the target color space. Transformations into device-independent values are also often necessary, such as Lab or spectral colors (see below), for example to be able to check the results of later measurements of printouts or to provide a device-independent database for display on any device. This is why the generic term used is the m values of the target color space.

Usually, the source color space and the target color space do not match. Standardized color spaces are often used as source color spaces when designing the layout, but printing takes place using concrete output systems with their own individual color behavior. Therefore, for each halftone dot of the layout, it is necessary to transform the given combination of the n device colors of the source color space into a combination of the m device colors of the target color space required for printing. The aim here is to produce a result through printing that comes as close as possible to the original, i.e. the digital layout, i.e. ideally produces the same appearance for the viewer.

A halftone point or pixel is any point on a layout that results from a specified rasterization of the layout objects. This in turn is related to the so-called resolution of the representation, for example, for the creation of the print form. If a grid with i rows and j columns is laid over a layout, this results in a resolution of i×j pixels. Each individual pixel can now be identified with regard to its color construction.

Color transformations are used to convert the layout data into printable data for a desired set of printing colors. This results, for example, in uniform, pure CMYK data for offset printing. Color transformations are also used to simulate the color appearance of these print data in a binding manner before printing. The color appearance is usually described device-independently in the CIELAB color space (Lab for short) or with the aid of spectral reflection factors. The print data with its assigned color space is transformed into these device-independent color data. These are displayed on a calibrated screen or with special proof printing systems (a so-called "proof", usually with inkjet systems). Related to this is the task of adapting print data for other printing processes, i.e. generating new print data for other inks from existing print data by means of a transformation, while retaining the original color impression as well as possible.

For the usual printing processes with usually no more than four colors, these transformation processes are largely tapped and standardized by corresponding data systems.

However, in packaging printing, for example, more than 4 printing colors are very often used. Traditionally, brand colors are added as spot colors and images are built up with product-specific colors (e.g. dairy products with an additional light gray printing color, chocolate products with various brown printing colors). For transparent film packaging, white printing ink is often used in addition. Each ink used occupies a printing unit in the press and requires its own printing forme for ink transfer. The colors are applied one after the other, and in principle all colors can be combined with each other (overprintable). The totality of the separate printing forms leads to the term "separation" as a process or result of the creation of the print data.

Machines with 7-10 inking units are not uncommon in flexo, offset and gravure printing. Designers for branded products can select the printing inks from thousands of spot colors, for example, from over 2000 shades in the PANTONE® system. These inks are produced and supplied by ink manufacturers. In so-called digital printing, inkjet and toner-based presses are used, which often contain 6-8 inking units, but are operated with fixed ink sets, since inkjet inks and colored toners often have to have very special, machine-dependent processing properties, or changing them would be too technically complicated. Typical color sets contain CMYK supplemented by orange or red, green, blue or violet, white.

Digital printing processes currently work more slowly than conventional printing processes, but since no printing formes have to be created and colors are not changed, the setup effort is much lower, making short runs more economical and personalized printing possible. Here, therefore, there is a desire to print an initially conventionally produced package in short runs or even personalized (run 1) as required, but the color appearance should be as identical as possible to previously printed products produced with individual spot colors. This is because different batches can stand side by side on the sales shelf. To achieve this, the print data available for the conventional printing process is converted from its source color space into a target color space that describes the digital printing process. In the extreme case of variable, personalized printing, different source data must be transformed for each copy, in which case the transformation becomes a bottleneck.

The color transformations mentioned at the beginning thus convert from a source color space Q (for example with n device colors) into another target color space Z with m values (for example device colors or the 3 CIELAB values L, a, b). This is done by applying a transformation rule TRV. These can be calculation formulas, transformation models or transformation tables already created based on TRV. They must be applied often per pixel, so high throughput is important (millions of pixels per second). To achieve this, interpolation is done in a prepared table, such as in the ICC industry standard. The table is built for combinations of n color values. Each of the n input colors can take values between 0 and 100% ink coverage. The table cannot list all combinations, but samples each input color at a certain specified resolution. It is a regular rectangular n-dimensional grid containing all combinations of the sampled levels. In between, n-dimensional interpolation is applied. The accuracy depends on the sampling. Typical samples are for n=3 (RGB/Lab) 33 steps ($33^3 \approx 36000$ table entries), for n=4 (CMYK) 17 steps (every 6.25%, $17^4 \approx 84000$ table entries). The number of gradations is the base of the power, the number n of inks is in the exponent. The generation of transformation tables are measures that are familiar to those skilled in the art. They are based, for example, on the spectrometric measurement of printed inks, calculations for estimation and/or interpolation, and the like.

The table size increases exponentially with the number n of input colors. Because the memory space is limited, the sampling must become coarser for practical reasons. For the frequent case n=7, often only 6 or 7 levels are used. An example is the widely used open source color management system LittleCMS, which uses 7 stages (every 16.67%, $7^7 \approx 820000$ table entries). The table structure therefore leads to the following problem: the more inks, the larger the table, and the fewer gradations can be stored. Users expect a comparable accuracy with CMYK+additional colors as they are used to with CMYK. 7 steps are considerably too coarse.

Known solution approaches are disclosed in DE 10 2004 003 300 A1, according to which assignment tables that have more than four input color components are divided into several assignment tables with a maximum of four input color components. This technique is intended to solve the problem of assignment tables that are too large. It is a concrete proposal to solve this problem by basically reducing to 4-component tables, according to convention, since the prior art takes advantage of the fact, valid at its time, that even in seven-color printing, usually no more than four colors are printed on top of each other at one point on the printed sheet. For this reason, the reduction to 4-component tables is also being pushed. To ensure this in case of doubt, additional processes such as Gray Component Replacement (GCR) and Color Component Replacement (CCR) are applied when creating the separation table. A similar prior art results from Boll H: "A COLOR TO COLORANT TRANSFORMATION FOR A SEVEN INK PROCESS", PROCEEDINGS OF SPIE, IEEE, US, Vol. 2170, Feb. 1, 1994 (1994 Feb. 1), pages 108-118, and U.S. Pat. No. 5,892,891 A.

Known solution approaches use a model or a combination of table and model. A model is usually a mathematically based transformation rule. In this way, the Lab color value of an overprint can be estimated from the individual printing colors. This is done, for example, when displaying layouts or PDF files on the screen and is fast but inaccurate. In the ICC further development iccMAX it is suggested to spectrally offset single colors, or to use tables for the CMYK portion and to modify their value for each additional color. In all cases, adding individual colors is too inaccurate because it does not or insufficiently take into account the interaction of colors in overprints in which these colors are involved.

There are more accurate models that better calculate the overprinting behavior of color mixtures, but they are nowhere near fast enough to be useful for transforming millions of pixels. In addition, the models provide Lab values or spectra, but no device color values, so they are not suitable for direct device-to-device ("device-link") transformation. This is because the device color values to be output are often subject to special separation rules (see below) and usually require special processing for high quality. However, the transformation into device colors is an extremely common application.

Color transformations are often applied to high-dimensional spaces. These occur both on the input side and on the output side.

On the input side, it can be the color combinations of a printing process, for example. Traditionally, the colors cyan, magenta, yellow, black were the standard in multicolor printing. For some years now, additional colors have been used to expand the chromaticity. In particular, efforts are underway to standardize seven-color printing with additional orange or red, green, blue or violet (known as ECG Printing=Expanded Color Gamut). Even more colors are used in packaging printing and in special applications such as banknote printing.

On the output side, there are m values, such as CIELAB color values (three components), printing color combinations of a target system, or spectral reflection factors (with values for wavelength ranges; e.g. m=31 values for 10 nm bands from 400 to 700 nm).

A common application is the prediction of the achieved color effect via the reflection spectra (output side) of proportionally overprinting colors (input side) in an industrial printing process. Only with the knowledge of such printing characteristics, further transformations can be formed to match data from one printing process to another in a color consistent manner Color transformations are based, as explained, on tables or on models.

With models, there are, for example, empirical-mathematical approaches or mechanistic-physical simulations of color behavior. In both model approaches, an adjustment of model parameters takes place, but there is usually a residual deviation between the model and reality, which one would like to reduce. Thus, one would like to correct the rigid model, which follows the internal laws, to target data that are independent of it.

In the case of tables in which multidimensional interpolation then takes place, one is more flexible, since one can freely adjust the entries. The problem here is that as the number n of input dimensions (printing colors) increases, the storage space for the color combinations increases exponentially, so that detailed storage is no longer possible. One suggested solution is to store only those combinations that occur at the same position in overprinting. These are usually only 4 overprinting colors. Consequently, some 4-dimensional tables are sufficient instead of a large n-dimensional one. Nevertheless, it can happen that in the color processing chain occasionally more than 4 color components occur which have to be transformed. Our suggestion, elaborated elsewhere, is now to estimate the output values by assembling multiple contributions from the existing tables: for example, one uses the largest 4-dimensional contributions and adds the missing colors by determining their color effect from other tables in which they occur and applying it to the large 4-dimensional output value. This estimation procedure is ultimately again a simple model that usually has a deviation from reality. However, a direct adjustment is not possible, because there are no table locations for more than 4 dimensions.

In this respect, it is desirable to correct the results of a table or model calculation to given nominal values. The correction should not only have a selective effect, but should also softly adapt the entire behavior of the neighborhood.

The state of the art contains correction methods that compensate for differences between target and actual values. In US 2005/0128498, there are expected reference values in the device-independent target color space Lab (m=3) for some printed color combinations from color components in the printer source color space (here CMYK, n=4). Using a concrete printing device, the color combinations are printed, the actual Lab values are measured, and the deviations are determined as differences. Based on the differences, an inverse transformation table is corrected from the absolute Lab color space back to the printer color space. This improves transformations from given device-independent Lab color values to output on exactly this concrete device, but it does not correct the original transformation from the source to the target color space to the actual values.

US 2006/0280537 also deals with a concrete printing device and describes that after determining a calibration need, a difference profile that is not described in more detail is generated and "synthesized" with the standard profile, and color-corrected print data is generated and printed with the help of the synthesized profile. The goal here is also the color compensation of changes and individual device differences. Here, too, the original transformation from the source to the target color space is not corrected to the actual values.

Based on the prior art described above, the invention is based on the task of improving a method for performing color space transformations using transformation rules in such a way that the results of a table or model calculation (n input values according to m output values, hereinafter referred to as core model) can be corrected to given nominal values.

The technical solution to this task consists in a method with the features of patent claim 1. Further advantages and features result from the subclaims.

The invention is based on the additional use of a correction process.

The invention comprises that corrections are also stored in multidimensional tables, but which manage with very few interpolation points, in the best case only 2 (for 0 and 100% of the input color), and which contain only as many dimensions as necessary, not necessarily all n input colors. Several such corrections can be applied successively to different, certainly also overlapping subspaces of the n colors. Due to the small number of interpolation points, the interpolated correction is automatically soft and radiates widely.

Accordingly, the invention proposes a method for performing transformations of color data from a source color space with n colors to a target color space with m values using a transformation rule TRV, characterized by the following steps:

a) Selecting a set of color data Q1 of the n colors of the source color space with the color components $q(1)$, $q(2), \ldots, q(n)$, for which a target value data set Z1 is available in the form of combinations of components $z(1), z(2), \ldots, z(m)$ of the target color space;

b) Generate a second set of color data Q2 of the n colors of the source color space with the color components $q'(1), q'(2), \ldots, q'(n)$, which are initially set identical to Q1;

c) Transform the set of color data Q2 using the transformation rule TRV to generate an actual value data set Z2 of the m values of the target color space $z'(1), z'(2), \ldots, z'(m)$;

d) Applying an n-dimensional optimization procedure which, by suitably modifying the set of color data Q2 and by repeating step c), minimizes the differences between the nominal value data set Z1 and the actual value data set Z2 in the sense of least squares error, so that Q2 finally contains the resulting optimized color components $q'(1), q'(2), \ldots, q'(n)$;

e) Calculate the differences $Dq(1)=q'(1)-q(1)$, $Dq(2)=q'(2)-q(2), \ldots, Dq(n)=q'(n)-q(n)$ of each color portion of the n colors of the optimized color data set Q2 to the respective color portion of the color data set Q1;

f) Calculate the differences $Dz(1)=z(1)-z'(1)$, $Dz(2)=z(2)-z'(2), \ldots, Dz(m)=z(m)-z'(m)$ of each component of the color data set Z1 to the respective component of the color data set Z2;

g) Applying the differences $Dq(1), Dq(2), \ldots, Dq(n)$ and $Dz(1), Dz(2), \ldots, Dz(m)$ in transformations of sets of color data from the source color space with n colors into the m values of the target color space, by adding the difference $Dq(i)$ to the color data $q(i)$ of the n colors of the source color space for the i=1 to n values when transforming a data set, the color data $q'(i)$ modified in this way are transformed with the aid of the transformation rule TRV into the m components $z'(j)$ for the j=to m values of the target color space, and then the corresponding difference $Dz(j)$ is added to the respective component $z'(j)$.

For a correction, a suitable, robust method must first be selected for how the output values are to be adjusted. Simple possibilities are e.g. differences to be added or factors to be multiplied, or other mathematical functions of value and correction value. This choice determines the type and application of the table entries. Differences are suitable when the correction in the target color space is rather independent of the magnitude of the output values, and have the advantage that the corrected values are more limited. Factors are suitable when the nature of the correction is more relative, i.e. value-dependent, e.g. for reflectance spectra, where model errors can often be well understood as a deviation in transmittance, which is after all a multiplicative process. Where no corrections are required, the ineffective entries are used (e.g. 0 for addition, 1 for multiplication). Factors can be easily traced back to differences by making the corrections in logarithmic space.

The invention assumes that for a set of color data (called Q1) from the n colors of the source color space, there is a secured, i.e. verified, nominal value data set of the m values of the target color space. This data set represents a kind of reference. It is denoted by Z1. The verified data set is obtained, for example, from the unique processing result by printing the n color components and spectrally measuring the result. Or it can be obtained, for example, from point-wise, elaborate model calculations for the n color components. If the target color space represents device-independent Lab values or spectra, spectral overprinting models can be used for this purpose. If the target color space represents m device colors, color separation algorithms can be used to calculate a suitable target color structure with m device color components in the target color space, taking printing rules into account.

A second set of color data Q2 is created as a copy of the set of color data Q1 so that it can subsequently be modified independently. Q2 is transformed using the intended transformation rule, for example using transformation tables. This generates another data set of the m values of the target color space. It is designated Z2 and represents the actual values of the transformation.

The differences between the two data sets Z2 (the transformation result of Q2) and Z1 (the nominal value data set) are determined.

These differences can now be applied to the transformations of color data from a source color space with n colors to a target color space with m values using the transformation rule TRV. They are recorded in a correction table, for example.

According to the invention, the data in the set of color data Q2 of the n colors of the source color space are changed and transformed using the provided transformation rule. Thereby a new Z2 is generated. This modification of Q2 and transformation into Z2 is performed until the differences Dz between the two data sets Z1 and Z2 are minimized in the sense of least squares error. For this optimization task, the methods for n-dimensional nonlinear optimization, which are well known in numerical mathematics, are suitable, for example the Levenberg-Marquardt algorithm.

This finally produces an optimized set of color data Q2 from the n colors of the source color space, and the difference Dq of the modified data Q2, which have produced minimized differences, from the unmodified data Q1 can now be determined.

These differences Dq and Dz can now be applied to the transformations of color data from a source color space with n colors to a target color space with m values using a transformation rule TRV.

If several correction steps are performed one after the other, which affect overlapping subspaces, the result generally depends on the sequence. Thus, the correction values of later steps also depend on the previously performed corrections. It is therefore advantageous according to the invention to generate the correction tables from the nominal values, the core model TRV and the sequence as follows:

The available target output values are given in the form of one or more coarse-level multidimensional tables, which sensibly cover larger subspaces (with u colors) than the stored fine-level (e.g. k-dimensional) table or model calculations up to the full n colors, if desired. In the order of these tables a correction chain is built up, which is empty at the beginning.

With the first setpoint table, the core model is called for all entries (as input data sets), the result is compared with the respective setpoint in all m components, the input values are optimized if desired, the required correction value of the input is calculated based on the optimization and the output based on the remaining difference to the setpoint, and the two corrections are entered into two new correction tables. These tables are placed around the core model as additional correction transformations on the input and output sides.

Then the next setpoint table is processed in the same way. The resulting second pair of correction tables thereby takes into account the effect of the first table, and in the case of overlapping entries no incorrect multiple correction takes place. Of course, overlapping, redundant setpoint entries should contain the same output values, so the set of setpoint tables should be consistent in itself.

In the end, a procedure is available that performs soft adjustments using comparatively few grid-based control points to their nominal values by invoking the core model and a chain of upstream and downstream corrections.

In a sense, it is a collection of concentric shells around the core model, each shell consisting of an input-side adjustment and an output-side adjustment, both defined on the same grid of input values. In other words, the table pairs have the same sequence of table entries, there are both n input correction values and m output correction values per entry, and input corrections are applied first when input values are transformed, then the next innermost shell (or the very inside of the core model) is called, and output corrections are applied after the return.

Depending on the application it makes sense that in step g) only one or both of the differences Dz(i), Dq(i) are applied. In general, the use of both difference tables leads to the fact that firstly the input data sets are transformed exactly to the nominal values, but furthermore not only a simple interpolation of the deviations takes place, but systematic deviations are already compensated on the input side, which provides a considerable advantage compared to the state of the art by extending the correction possibilities and improving the corrections.

Advantageously, to reduce the number of steps, it is proposed that in step d) only those color components of the n colors that are not zero are changed.

The method according to the invention is carried out according to a proposal of the invention on a computer unit by means of a control software, wherein the computer unit comprises an input unit for providing the digital color data of the project and an output unit for outputting the transformed color data as well as a memory on which the transformation tables are stored, wherein color data for the target color space are generated by means of the control software for input color data of the project using the transformation tables and are provided in a data set.

A more formal, general description of the process now follows:

Let the n-dimensional space of input vectors be Rn, the space of m-component output vectors be Rm. Let nominal values T from Rm be known for points P from a subspace Ru of the input space Rn with u≤n dimensions. A correction shell is placed around the core model M (Rn→Rm). A correction shell generally consists of an adjustment A of the input values (Ru→Ru) before the model and a coupled adjustment B of the output values (Ru→Rm) after the model. The corrected model (A→M→B) is still a mapping n→m. Further shells can be placed around the corrected model. A or B can be omitted. Formally, they can then be regarded as an identical mapping. In the implementation, the respective step would then be skipped. A and B are determined by processing all known points P as follows:

The input point P from Ru is associated with its setpoint T from Rm. The model provides a model output value V for this input vector (supplemented by zero entries in the missing n-u dimensions).

If the figure A is used, it serves as preparation of the input values. Then, for each point P, a modified input value P' is sought whose model output value V' is closer to T. An often used method is the Levenberg-Marquardt method, a multidimensional nonlinear optimization of the input parameters P, using constraints as needed, such as the valid domain of definition. Thus, the mapping A consists of pairs (P, V). This step happens before the determination of B.

If the mapping B is used, the model (if necessary pre-corrected by A) is queried for each point P. That is, if figure A is used, P→P' is mapped with it and V is given into the model. If mapping A is not used, P is given directly into the model. The model provides a model output value V with m components. The deviation from the nominal value T can be seen, for example, as a component-wise difference D=T−V or as a component-wise factor F=T/V, so that the model would be corrected exactly to the nominal value T by V+D=T or by V*F=T. The mapping B then consists of pairs (P, D) or (P, F) and provides the correction value applied to V.

So that these point-wise corrections can also softly influence the neighborhood of the known points, the mappings A and B must be interpolable. Here, for example, topological methods like "Natural Neighbor Interpolation" are possible or "Thin Plate Splines", which can be configured with arbitrary points. But most efficient and easily controllable are regular rectangular u-dimensional lattice tables as established in color transformations e.g. in ICC profiles, or combined collections thereof.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 22020392.1, filed Aug. 15, 2022, are incorporated by reference herein.

Application examples are described and illustrated below:

Example 1: The Goal is the Color Transformation of 7 Printing Color Values into Spectral Reflectance Values For this, there would be an elaborate (e.g. physical) prediction model that can calculate reflectance values for arbitrary overprint combinations. However, it is too slow for application to millions of pixels in print files, and it is also too costly to fill a detailed 7-dimensional table with predictions, because such a table would be huge.

Therefore, this prediction model only populates a collection of detailed tables for all 4-dimensional subspaces, because that covers the normally occurring, important color combinations in print. In addition, there is a component that can quickly (but roughly) estimate queries with 5 to 7 colors from the known 4-dimensional tables. The collection plus the estimation component result in the model M.

Since this estimate is a kind of extrapolation (into untabulated additional dimensions), it is advantageous to control it selectively. One can now add as Figure B a collection of roughly graded 5-dimensional subspace tables. Again, there is an estimation component for queries with 6 or 7 colors. For each entry P, the correction D or F arises from the estimation result V from M relative to the target value T from the prediction model. This already improves 5-dimensional queries. (For 4-dimensional entries one can directly set the correction D=0 or F=1).

As a further correction shell, another FIG. B2 can be added with a 7-dimensional table, which contains only the corners (0 or 100%), i.e. only $2^7$ entries. These few can still be calculated well with the prediction model. Thus, the free extrapolation is completely captured and provides reasonable, controlled results for all queries.

Example 2 (FIGS. 1 and 2): The Goal is to Fit a Physical Prediction Model to Measured Values from a Test Chart A physical prediction model describes the optical behavior of colors printed on top of each other or mixed. The printing substrate serves as the basis. The properties of the individual inks are characterized, for example, by effective halftone dot area fractions, layer thicknesses and transmission and scattering spectra, using for this purpose color patches consisting only of gradations of individual printing inks. The ink transfer from ink to paper and from ink to already printed ink is process-dependent. This so-called ink acceptance behavior is usually determined on ink patches that consist of a pair of full-surface applied inks. This means that the printed image is essentially physically captured. It is now possible to calculate the reflectance spectrum for any color combination.

However, this model is only a simplified representation of reality. One would therefore like to use additional color patches to softly adapt the model to the actual measured values. For this purpose, there are established test charts such as the ECI2002 test chart for CMYK printing processes.

This test chart contains, among other things, all CMYK combinations of 0, 40, or 100% tone values. With these $3^4$=81 fields, an image A and an image B can be matched.

Figure A corresponds to an interaction in the screened halftone that is not adequately described by the model. For example, an overprint of 40% cyan followed by 40% magenta could be more reddish in the model than in reality, because in reality the magenta halftone dots adhere more poorly to the cyan halftone dots than corresponds to the full-solid ink transfer. Then the input dot (40,40,0,0) would map approximately to a modified dot (40,36,0,0). The physical interpretation could be that magenta is transferred 10% weaker to cyan in the halftone.

Figure B takes on the residual error of the model after this preliminary adjustment, so that overall the model measured exactly reproduces the measured values on the $(0,40,100)^4$ grid.

This bends the model at essential points. The ECI2002 test chart also contains even finer CMYK combinations, but these are not complete in the black direction, so that individual nominal values are missing. One can next use the combinations of CMY (0,20,40,70,100) with K (0,20,40,80, 100) and place another correction shell around the model. The previously corrected (0,40,100) combinations will then get a zero correction in the outer shell. The new levels will need only a relatively small correction, because the inner (0,40,100)-shell will have bent to a large extent also in the intermediate tones by interpolation of the corrections. The non-existing nominal values leave "holes" in the correction table A and B, which are softly filled by interpolation of set neighbors. Furthermore, a third shell can be filled from the finest gradation CMY (0,10,20,30,40,55,70,85,100) and K (0,10,20,40,60,80,100) and thus has exactly reproduced more than 90% of the color patches of the ECI2002 test chart.

Finally, a concrete use case is described using the example of using subspace tables that have stored correct target values for input data with up to k (4) color components, and for which an estimation procedure provides estimated target values for input data with more than k color components (up to n).

Given is a transformation that is to be corrected, represented by subspace tables. The transformation provides a "result" of m values for input color data from n color components. This can be achieved for any input (combinations of shares between 0 and 100% of the n colors) by interpolation.

For a set of inputs, the correct results exist. These are correct, validated results that should match those produced by the transformation. The results have been produced, for example, by printing and measuring the input color data or transformation by another model with good results.

The following is an example of a concrete calculation for subspace tables with k=1, only one color, for a total of n=2 colors. The target color space is Lab, i.e. the m=3 values brightness, reddish value, yellowish value.

| Subspace table 1: for printing color yellow | | |
| --- | --- | --- |
| 0% | Yellow 95 0 0 | (very light, not reddish, not yellowish, unprinted paper) |
| 100% | Yellow900100 | (light, not reddish, very yellowish) |

| Subspace table 2: for magenta ink | | |
| --- | --- | --- |
| 0% Magenta 95 0 0 | | (very light, not reddish, not yellowish, unprinted paper) |
| 100% Magenta | 55700 | (medium brightness, very reddish, not yellowish) |
| Also known is the correct target value for the input 100% yellow + 100% magenta: | | |
| 100% Yellow + 100% Magenta | 546562 | (by model or pressure+measurement) |
| The transformation provides | | |
| 100% Yellow + 100% Magenta | 526764 | |
| The difference from the set point is | | |
| 100% Yellow + 100% Magenta | +2−2−2 | (makes brighter, less reddish+yellowish) |
| An optimization process would now reduce the color components of yellow and magenta. | | |
| The result could be exemplary | | |
| 98% yellow + 96% magenta | 536462 | |
| The difference to the target value is minimized, but not zero. Even less magenta would make it brighter, but would further lower the redness, and it is already too low. | | |
| 98% Yellow + 96% Magenta | −1  −1   0 | (still too dark, not red enough) |
| The difference for optimized input values is assigned to the original input value, | | |
| 100% Yellow + 100% Magenta | −2% yellow | −4% magenta |

By applying this difference to the result, the transformation can be corrected for this input.

Another input, e.g. 50% yellow+50% magenta, is far from the known input value. The target is probably a smaller correction. It could e.g. decay with the distance.

The two tables from the set of inputs and their input differences and target value differences could then be like this:

| YellowMagenta | ΔYellowΔMagenta | | ΔLΔaΔb |
|---|---|---|---|
| 0%0% | 00 | 000 | |
| 100%0% | 00 | | 000 |
| 0%100% | 00 | | 000 |
| 100%100% | −2−4 | −1−1 | 0 |

In it you can interpolate:

| | | | | |
|---|---|---|---|---|
| 50%50% | −1/2−1 | +1/4−1/4 | 0 | (contribution here is 1/4 each) |

This is the correction to be applied to the input as well as to the result of the transformation (estimation procedure). The result would first be calculated as follows:

The input values for yellow and magenta are corrected from 50% + 50% to 49.5% + 49%.
In subspace table 1: interpolated for printing color yellow
49.5% Yellow 92. 5050 (very light, not reddish, moderate yellowish)
In subspace table 2: interpolated for magenta ink:
49% Magenta75350(rather light, moderately reddish, not yellowish)
The estimation method provides by combination (from XYZ color space)
49.5% Yellow + 49% Magenta733441
Final result after correction of the target values:
50% yellow + 50% magenta73 .2533 .7541 (interpolated Δ were added)

The invention describes a solution that is practicable and feasible for the person skilled in the art, with which a sufficiently fast and high-quality color space transformation into the color space of the concrete printing system is possible even with a very high resolution of a layout and a large number of input colors.

BRIEF DESCRIPTION OF THE DRAWINGS

Further advantages and features result from the following description based on the figures. Thereby show:

FIG. 1 shows the steps of the correction method with iterative adjustment of the source data and subsequent residual correction of the target data for a selected color data set Q1 of the n colors of the source color space (101) with the color components of the colors $q(1), q(2), \ldots, q(n)$, for which a verified, saved target value data set Z1 of the m values of the target color space (102) with the components $z(1), z(2), \ldots, z(m)$ is available, approximately by measurement. In step 103 the current source color data set Q2 is initialized with the start value (101). This is transformed using the provided transformation rule, for example a model, in step 104. The data set Z2 of the m values of the target color space 105 with the components $z'(1), z'(2), \ldots, z'(m)$ is generated.

In step 106, the differences of the individual values are calculated from Z1 and Z2 respectively. These differences are checked in 107 to see if they are sufficiently small. If not, the color data set Q1 from step 103 is modified in step 108 to generate the color data set Q2. The modified color data set is transformed in step 104 and steps 105 to 107 are repeated. The steps are meant schematically, the actual procedures are part of the optimization method used, especially how the modification is determined in step 108. Finally, if the differences are minimal, the differences of the source color data sets Q2-Q1 are calculated in step 109. For example, they are maintained in transformation tables for a large number of pairs of Q1 and Z1 and their differences Z1-Z2 as well as Q2-Q1 and can be interpolated. The source differences are applied to the input data in the overall transformation 110, followed by the original transformation 104 to the target color space and the final correction of the residual error 106.

Figure 1:
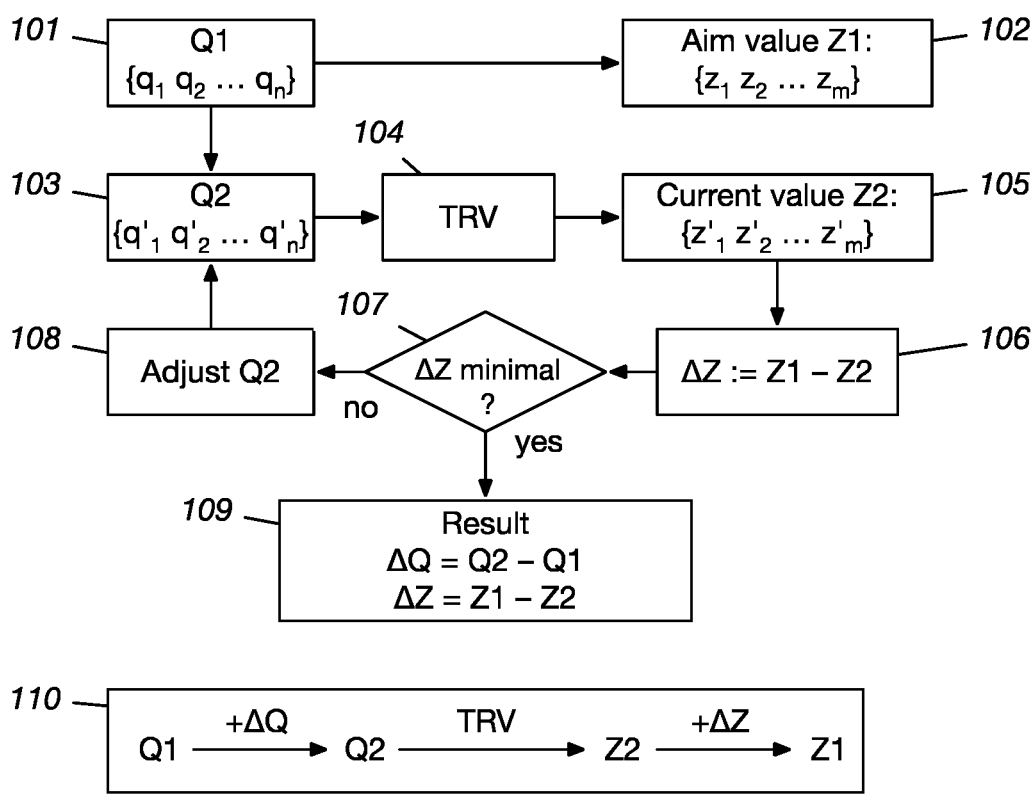
FIG. 1 the source- and target-side correction of a transformation based on target values.
Figure 2:
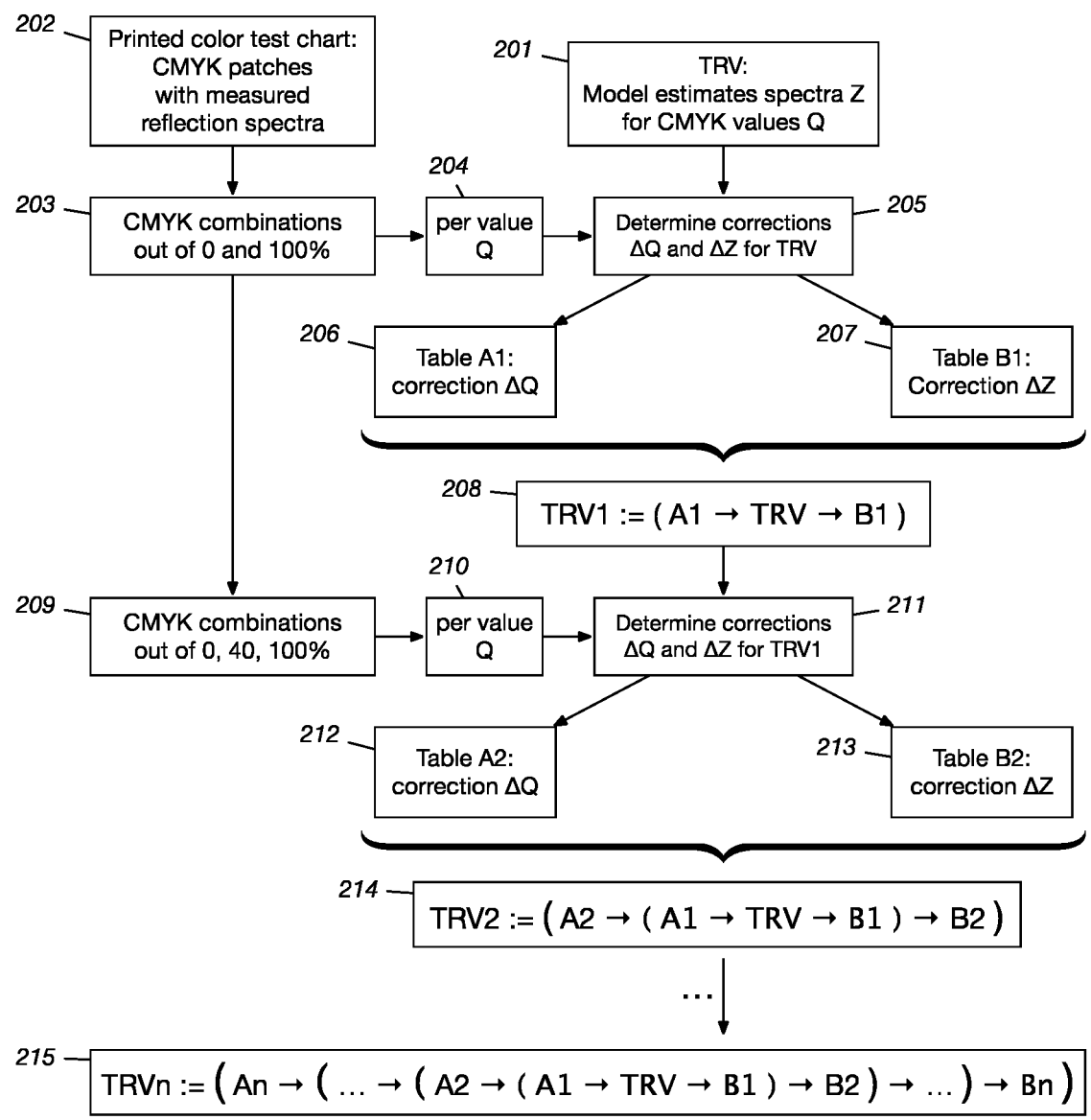
FIG. 2 the nesting of corrections up to the desired accuracy.

FIG. 2 refers to example 2 in the description starting on page 15. It describes the multiple hierarchically subdivided correction of a model TRV 201 using measurement data of a printed CMYK test chart 202. For the first correction at the corners of the CMYK color space, the $2^4=16$ combinations of 0 and 100% and their measurement data are taken in step 203. For each combination (204), the source and target side corrections are determined (205) as in FIG. 1 and tabulated, resulting in a total of tables A1 (206) and B1 (207) with 16 entries each. These are combined with the model transformation rule TRV to a new, corner-corrected transformation TRV1 (208).

The second correction uses the CMYK combinations of 0, 40 and 100% available in many test charts (209) and their measured values. For each of the $3^4=81$ combinations (210) the corrections for TRV1 are determined (211) and stored in the tables A2 (212) and B2 (213). Since the corners were already correctly corrected in TRV1, these 16 of the 81 correction entries are zero. A2 and B2 are placed as the next correction shell around TRV1, so that there are now two shells around TRV (214).

The TRV2 model (214) corrected in this way is accurate at all corners and in the midtones and requires only minor adjustments. Further shells use the combinations 0, 20, 40, 70, 100 for CMY and 0, 20, 40, 60, 100 for K in the case of the ECI2002 or IT8.7/4 test charts and then 0, 10, 20, 30, 40, 55, 70, 85, 100 for CMY and 0, 10, 20, 40, 60, 80, 100 for K. This makes optimum use of the grid structure of these standard test charts. With a model corrected in this way, CMYK print data for a project can be spectrally simulated and then displayed on the screen or on inkjet test printing systems using standard procedures.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Method for computer-aided performance of transformations of color data from a source color space to a target color space using a given transformation rule TRV,
   wherein the source color space comprises n colors which are present in combinations of color portions $q(1)$ to $q(n)$ in each dot to be printed, the target color space comprises m values that can be combined to form combinations of components z(1) to z(m), and there are at least some combinations of color components q(1), q(2), . . . , q(n) of the source color space for which combinations of components z(1), z(2), . . . , z(m) of the target color space are assigned, characterized by the following steps:

a) selecting a set of color data Q1 of the n colors of the source color space with the color components q(1), q(2), . . . , q(n), for which a target value data set Z1 is available in the form of combinations of components z(1), z(2), . . . , z(m) of the target color space;

b) generate a second set of color data Q2 of the n colors of the source color space with the color components q'(1), q'(2), . . . , q'(n), which are initially set identical to Q1;

c) transform the second set of color data Q2 using the transformation rule TRV to generate an actual value data set Z2 of the m values of the target color space z'(1), z'(2), . . . , z'(m);

d) applying an n-dimensional optimization procedure which, by suitably modifying the second set of color data Q2 and by repeating step c), minimizes the differences between the nominal value data set Z1 and the actual value data set Z2 in the sense of least squares error, so that Q2 finally contains the resulting optimized color components q'(1), q'(2), . . . , q'(n);

e) calculating the differences Dq(1)=q'(1)−q(1), Dq(2)=q'(2)−q(2), . . . , Dq(n)=q'(n)−q(n) of each color portion of the n colors of the optimized color data second set Q2 to the respective color portion of the color data set Q1;

f) calculating the differences Dz(1)=z(1)−z'(1), Dz(2)=z(2)−z'(2), . . . , Dz(m)=z(m)−z'(m) of each component of the color data set Z1 to the respective component of the color actual value data set Z2;

g) applying the differences Dq(1), Dq(2), . . . , Dq(n) and Dz(1), Dz(2), . . . , Dz(m) in transformations of sets of color data from the source color space with n colors into the m values of the target color space, by adding the difference Dq(i) to the color data q(i) of the n colors of the source color space for the i=1 to n values when transforming a data set, the color data q'(i) modified in this way are transformed with the aid of the transformation rule TRV into the m components z'j) for the j=1 to m values of the target color space, and then the corresponding difference Dz(j) is added to the respective component z'(j), wherein the method is carried out for a plurality of sets of color data Q and in that the determined differences Dq(i)$^3$ and Dz(i)$^3$ for a plurality of sets Q are managed in transformation tables and, in the case of transformations in step f), the differences to be applied are interpolated in these transformation tables, and wherein the method requires, a first correction, wherein said first correction corrects data relating to the corners of the CMYK color space, and utilizing differences from the source color space, target color space of the CMYK color space used in the first correction and the transformation rule TRV to generate a corner-corrected transformation TRV1, a second correction, wherein said second correction provides CMYK print data that is accurate at all corners and in the midtones and is output in a state that could receive minor adjustments, utilizing the differences of source color space and target color space of CMYK print data used in the second correction with the transformation TRV1 to generate a further corrected model TRV2, and spectrally simulating and then displaying on a screen CMYK print data based on the corrections to model TRV2.

2. Method according to claim 1, characterized in that for determining a setpoint data set Z1 the data set Q1 is printed out and the setpoint color data set Z1 is determined by spectral measurement.

3. Method according to claim 1, characterized in that in step d) only those color components of the n colors are changed which are not zero.

4. Method according to claim 1, characterized in that the method is carried out on a computer unit by means of control software, the computer unit comprising an input unit for providing the digital color data of the source color space of a project and the output unit for outputting the transformed values of the target color space as well as a memory on which transformation tables are stored, values for the target color space being generated by means of the control software for input color data of the project using the transformation tables and being provided in a data set.

5. Method for computer-aided performance of transformations of color data from a source color space to a target color space using a given transformation rule TRV, wherein the source color space comprises n colors which are present in combinations of color portions q(1) to q(n) in each dot to be printed, the target color space comprises m values that can be combined to form combinations of components z(1) to z(m), and there are at least some combinations of color components q(1), q(2), . . . , q(n) of the source color space for which combinations of components z(1), z(2), . . . , z(m) of the target color space are assigned, characterized by the following steps:

a) selecting a set of color data Q1 of the n colors of the source color space with the color components q(1), q(2), . . . , q(n), for which a target value data set Z1 is available in the form of combinations of components z(1), z(2), . . . , z(m) of the target color space;

b) generate a second set of color data Q2 of the n colors of the source color space with the color components q'(1), q'(2), . . . , q'(n), which are initially set identical to Q1;

c) transform the second set of color data Q2 using the transformation rule TRV to generate an actual value data set Z2 of the m values of the target color space z'(1), z'(2), . . . , z'(m);

d) applying an n-dimensional optimization procedure which, by suitably modifying the second set of color data Q2 and by repeating step c), minimizes the differences between the nominal value data set Z1 and the actual value data set Z2 in the sense of least squares error, so that Q2 finally contains the resulting optimized color components q'(1), q'(2), . . . , q'(n);

e) calculating the differences Dq(1)=q'(1)−q(1), Dq(2)=q'(2)−q(2), . . . , Dq(n)=q'(n)−q(n) of each color portion of the n colors of the optimized color data second set Q2 to the respective color portion of the color data set Q1;

f) calculating the differences Dz(1)=z(1)−z'(1), Dz(2)=z(2)−z'(2), . . . , Dz(m)=z(m)−z'(m) of each component of the color data set Z1 to the respective component of the color actual value data set Z2;

g) applying the differences Dq(1), Dq(2), . . . , Dq(n) and Dz(1), Dz(2), . . . , Dz(m) in transformations of sets of color data from the source color space with n colors into the m values of the target color space, by adding the difference Dq(i) to the color data q(i) of the n colors of the source color space for the i=1 to n values when transforming a data set, the color data q'(i) modified in this way are transformed with the aid of the transformation rule TRV into the m components z'(j) for the j=1 to m values of the target color space, and then the corresponding difference Dz(j) is added to the respective component z'(j), and h) outputting the transformed color data by an output unit wherein the method is carried out for a plurality of sets of color data Q and in that the determined differences $Dq(i)^3$ and $Dz(i)^3$ for a plurality of sets Q are managed in transformation tables and, in the case of transformations in step f), the differences to be applied are interpolated in these transformation tables, and wherein the method requires, a first correction, wherein said first correction corrects data relating to the corners of the CMYK color space, and utilizing differences from the source color space, target color space of the CMYK color space used in the first correction and the transformation rule TRV to generate a corner-corrected transformation TRV1, a second correction, wherein said second correction provides CMYK print data that is accurate at all corners and in the midtones and is output in a state that could receive minor adjustments, utilizing the differences of source color space and target color space of CMYK print data used in the second correction with the transformation TRV1 to generate a further corrected model TRV2, and spectrally simulating and then displaying on the output unit CMYK print data based on the corrections to model TRV2, wherein the output unit is a screen.

\* \* \* \* \*